US00RE48307E

(19) United States
(12) Reissued Patent
Lingvall et al.

(10) Patent Number: US RE48,307 E
(45) Date of Reissued Patent: Nov. 17, 2020

(54) SYSTEM AND METHOD FOR EARLY TRAIN DETECTION

(71) Applicant: WAVETRAIN SYSTEMS AS, Lysaker (NO)

(72) Inventors: Fredrik Lingvall, Oslo (NO); Tron Danielsen, Kjeller (NO)

(73) Assignee: WAVETRAIN SYSTEMS AS, Lysaker (NO)

(21) Appl. No.: 16/276,417

(22) Filed: Feb. 14, 2019

Related U.S. Patent Documents

Reissue of:
(64) Patent No.: 9,327,744
Issued: May 3, 2016
Appl. No.: 14/743,679
Filed: Jun. 18, 2015

U.S. Applications:
(63) Continuation of application No. 13/824,273, filed as application No. PCT/NO2011/000257 on Sep. 16, 2011, now Pat. No. 9,067,608.

(30) Foreign Application Priority Data

Sep. 17, 2010 (NO) ..... 20101301

(51) Int. Cl.
*B61L 29/28* (2006.01)
*B61L 25/04* (2006.01)
*B61L 25/02* (2006.01)

(52) U.S. Cl.
CPC ..... *B61L 29/284* (2013.01); *B61L 25/023* (2013.01); *B61L 25/04* (2013.01); *B61L 29/28* (2013.01)

(58) Field of Classification Search
CPC ..... B61L 25/04; B61L 25/023; B61L 29/284
(Continued)

(56) References Cited

U.S. PATENT DOCUMENTS 4,179,744 A * 12/1979 Lowe ..... B61L 1/08 246/122 R
5,265,831 A * 11/1993 Muller ..... 246/124
(Continued)

FOREIGN PATENT DOCUMENTS

CN 1187439 A 7/1998
CN 1822976 A 8/2006
(Continued)

OTHER PUBLICATIONS

English translation of the Korean Office Action, dated May 17, 2019, for Korean Application No. 10-2019-7002071.

*Primary Examiner* — Russell D Stormer
(74) *Attorney, Agent, or Firm* — Birch, Stewart, Kolasch & Birch, LLP

(57) ABSTRACT

Train detection security system and method for detecting a moving train are provided. The train detection security system includes one or more sensor units fixed to a rail of a rail track. The sensor units are arranged for detecting a first signal induced by a moving train and propagated through the rail. The system further includes a control unit including a signal processor arranged for receiving first sensor output signals representing the first signals from each of the one or more sensor units, processing the first sensor output signals and generating a train warning signal representing characteristics of the moving train based on envelope characteristics of the first sensor output signals.

20 Claims, 4 Drawing Sheets

Amended

(58) Field of Classification Search
USPC ..... 246/122 R, 122 A, 123, 124, 479, 488
See application file for complete search history.

(56) References Cited

U.S. PATENT DOCUMENTS

| | | | | | |
|---|---|---|---|---|---|
| 5,285,831 | A * | 2/1994 | Woolgar | ..... | 144/48.6 |
| 5,713,540 | A * | 2/1998 | Gerszberg et al. | ..... | 246/121 |
| 5,864,304 | A * | 1/1999 | Gerszberg et al. | ..... | 340/903 |
| 5,907,294 | A * | 5/1999 | Welte et al. | ..... | 340/903 |
| 5,924,651 | A * | 7/1999 | Penza et al. | ..... | 246/124 |
| 6,895,362 | B2 * | 5/2005 | Davenport et al. | ..... | 702/182 |
| 6,951,132 | B2 * | 10/2005 | Davenport et al. | ..... | 73/598 |
| 7,624,952 | B1 * | 12/2009 | Bartek | ..... | B61L 23/06 246/124 |
| 8,985,523 | B2 * | 3/2015 | Chadwick et al. | ..... | 246/167 R |
| 9,031,791 | B2 * | 5/2015 | Nedilko et al. | ..... | 702/14 |
| 2004/0261533 | A1 | 12/2004 | Davenport et al. | | |
| 2006/0151672 | A1 | 7/2006 | Heddebaut et al. | | |
| 2011/0133038 | A1 * | 6/2011 | Kiss, Jr. | ..... | B61L 29/24 246/126 |
| 2011/0174934 | A1 * | 7/2011 | Kikuchi | ..... | B61L 1/187 246/122 R |
| 2013/0248659 | A1 * | 9/2013 | Lingvall et al. | ..... | 246/126 |

FOREIGN PATENT DOCUMENTS

| | | | | |
|---|---|---|---|---|
| CN | 1870836 | A | 11/2006 | |
| DE | 4428784 | A1 | 2/1996 | |
| EP | 0816200 | A1 | 1/1998 | |
| EP | 816200 | A1 * | 1/1998 | ..... B61L 1/06 |
| JP | 63-154465 | A | 6/1988 | |
| JP | 2006-290226 | A | 10/2006 | |
| WO | WO 91/10584 | A1 | 7/1991 | |

* cited by examiner

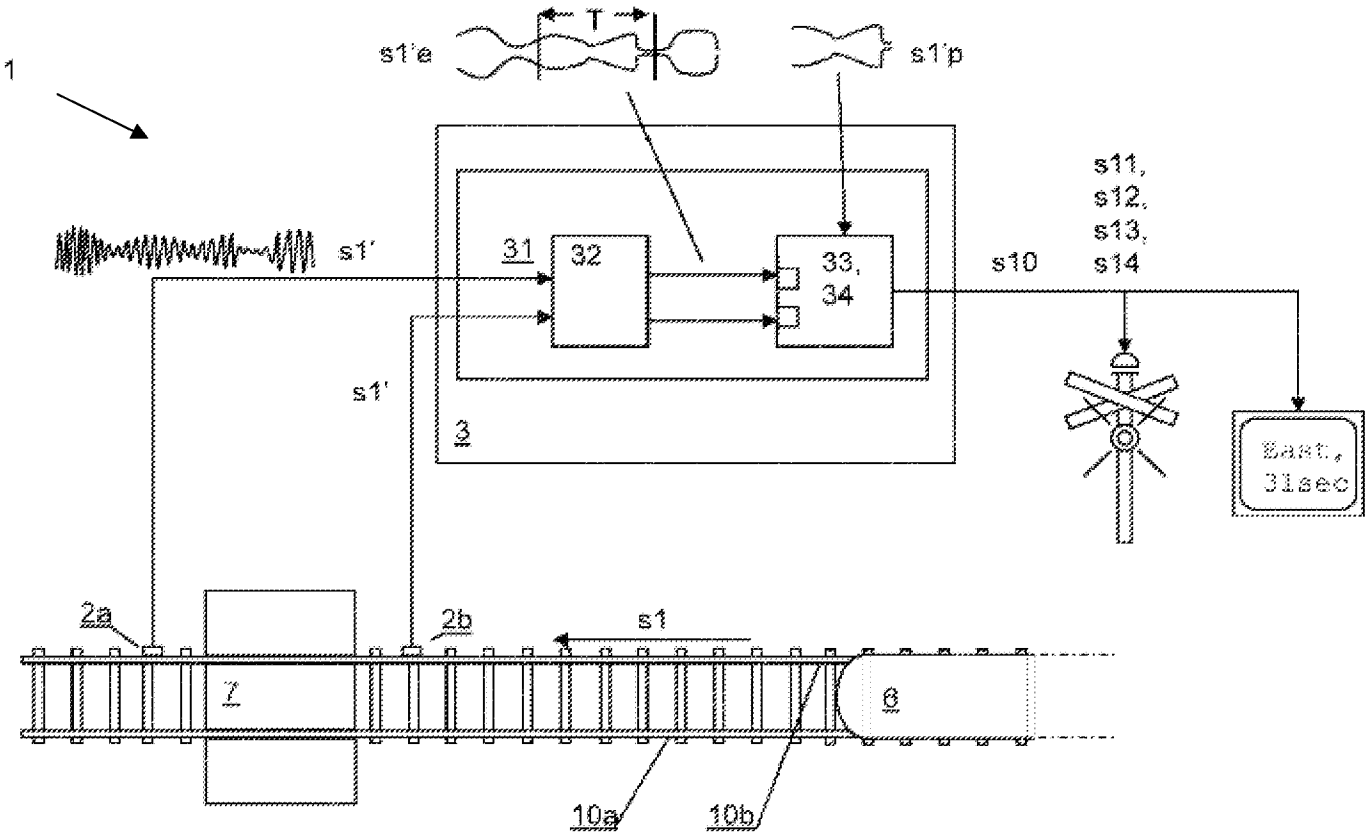
Fig. 1
Amended

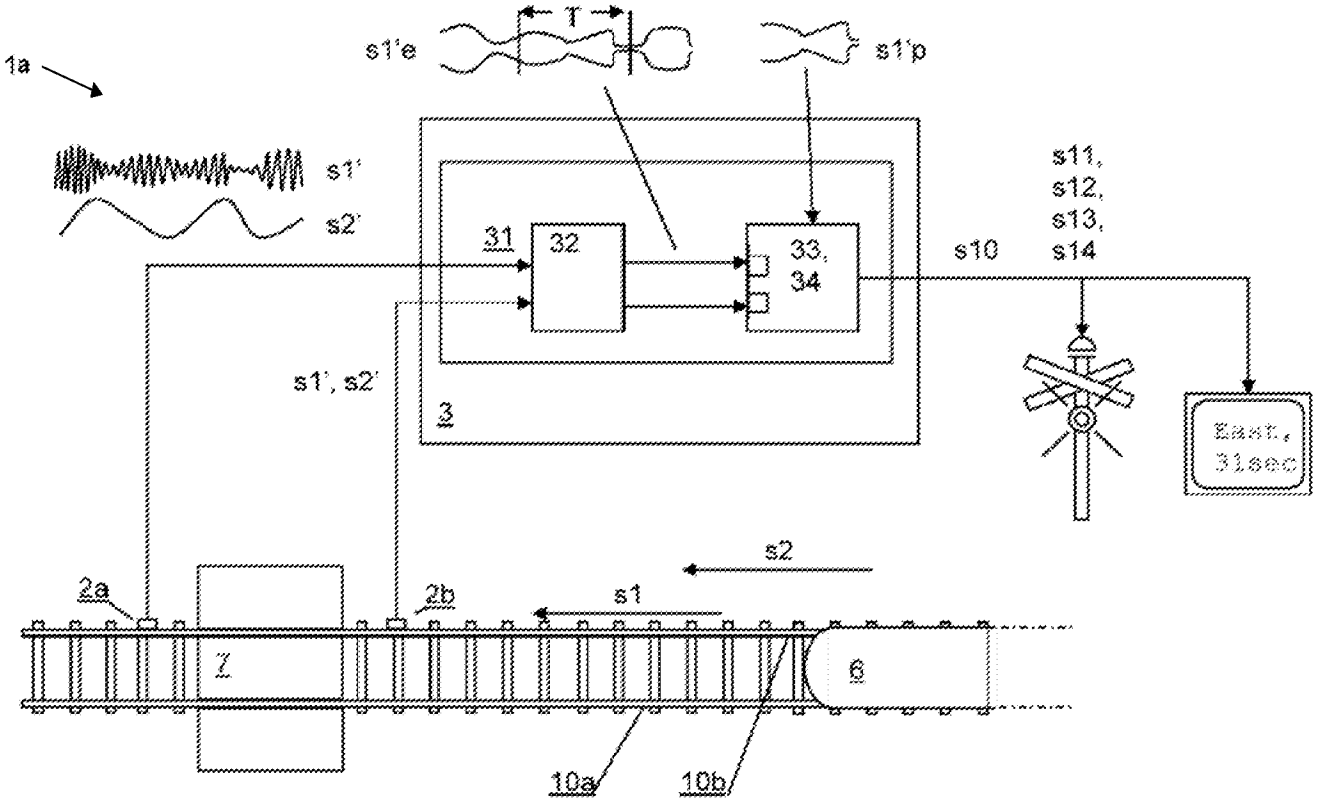
Fig. 2
Amended

SYSTEM AND METHOD FOR EARLY TRAIN DETECTION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a Continuation of co-pending application Ser. No. 13/824,273, filed on Jun. 4, 2013, which is the National Phase of PCT International Application No. PCT/NO2011/000257, filed on Sep. 16, 2011, which claims priority under 35 U.S.C. 119(a) to Patent Application No. 20101301, filed in Norway on Sep. 17, 2010, all of which are hereby expressly incorporated by reference into the present application.

BACKGROUND OF THE INVENTION

1. Field of the Invention

The invention relates to a system and method for detection of a remote train in motion on a railroad track, and the subsequent generation of signals, for early warning on an unsecured railroad crossing or other locations where approaching trains may cause danger. The system according to the invention may also be used to generate signals representing characteristics of the detected train, such as the train type and its speed and direction.

2. Description of Background Art

Railroad crossings are often the scenes of tragic accidents when car drivers, cyclists or pedestrians underestimate the danger at these junctions. Worldwide, accidents at railroad crossings lead to thousands of casualties every year, and above all, at unsecured crossings. Http://www.rail-reg-.gov.uk/upload/pdf/railsafety0304.pdf from Office of Rail Regulation in the UK shows that the Great Britain railway network alone had 18 deaths of members of the public in 2004, 17 of which happened at non-secured level crossings.

Manual detection and warning is the most widely used method when railway track maintenance has to be performed on tracks that are operated by trains. Usually one or more of the maintenance workers have to supervise the track at a remote location relative the maintenance location, and call their colleagues at work if a train should appear.

A number of systems for detecting a train at a specific location have been developed. In such systems the train is detected when it passes a sensor, and the output sensor signal is used to trigger a warning system or an automatic level crossing gate. The sensor may communicate with the warning system or automatic level crossing by cable or radio signals.

U.S. Pat. No. 5,924,651 shows a warning system and method for warning personnel in proximity to railroad tracks of an approaching train. A transmitter for transmitting a warning signal in response to a train sensor detecting passage of a train over the railroad tracks at a given location is used.

Early detection of remote trains by listening on the rails was known by the American Indians. By listening over a certain time period the Indians were able to determine whether the train was approaching or departing.

U.S. Pat. No. 5,265,831 describes a method and apparatus for detecting an impact sound by an impact sound receiver, such as a sound caused by a railroad vehicle approaching a specific location, and if the intensity of the output from the sound receiver is above a certain level, a minimum time, a warning signal is triggered.

SUMMARY OF THE INVENTION

Given the high number of tragic accidents related to unsecured railroad crossings despite the numerous attempts to solve the problems as described above under background art, it is clear that automatic solutions for security systems so far have not been successful, and that the problem related to securing the public at railroad crossings is still to be solved.

When scheduled or unscheduled maintenance of the tracks has to be performed at any location along the track, it is common to use manual warning systems to protect the workers on the track.

On certain railway locations there is a huge risk of encountering wild animals, and apart from the suffering of the animals, such accidents are very unpleasant for the train guard who often has to destroy the animal before continuing his ride. The present invention may be used to scare animals by light and sound signals when an arriving train is detected near animal tracks crossing the railroad.

The present invention is an early warning system and method that may be used in all the situations described above to drastically reduce the risk of accidents on the railroad tracks. As will be known, the speed of trains is gradually increasing since track and train technology is continuously improving. Early detection, i.e. detection of the train at longer distances from the warning location therefore becomes increasingly important. However, early detection and a corresponding early warning may not be desirable in all cases since some trains may be considerably slower than other trains, and too early warnings may lead to an inefficient system with too long warning periods. The present invention therefore allows to detect trains at various speed and send signals to a level crossing for closing it at a constant time before the train passes.

The system and method according to the invention has several advantages:

The present system and method for early train detection is able to detect trains earlier than background art due to the new low noise sensor technology, and the arrangement of sensors along the rail at specific positions of the rail profile where the signal to noise ratio is optimised.

In addition the present system in an embodiment of the invention may calculate one or more output signals, such as a warning signal based on the trains distance from the warning location, the direction, the speed of the train, the time until train arrives at the location etc.

According to the invention, the system is autonomous, i.e., it does not impair existing systems along the track or the railroad traffic, and only small technical installations are necessary.

The system can be permanent or temporary, i.e. the system may be set up permanently near a railroad crossing, or it can be used by a maintenance team to set up systems temporarily for each maintenance project.

Due to the mechanical and functional aspects of the system according to the invention, it is easy to install and operate, thus reducing the costs associated with permanent or temporary warning systems. The advantageous design therefore makes it suited also for remote railroad crossings where cost/benefit has prevent warning systems according to background art.

BRIEF DESCRIPTION OF THE DRAWINGS

The present invention is further described by way of reference to the accompanying drawings, wherein embodiments of the invention is shown.

FIG. 1 illustrates an embodiment of the invention in a schematic drawing where the signals (s1), i.e. waves propagated in the rails from the train are detected and analysed.

FIG. 2 illustrates an embodiment of the invention in a schematic drawing where signals (s1) and seismically propagated signals (s2) from the train are detected and analysed.

DETAILED DESCRIPTION OF THE INVENTION

Figure 3:
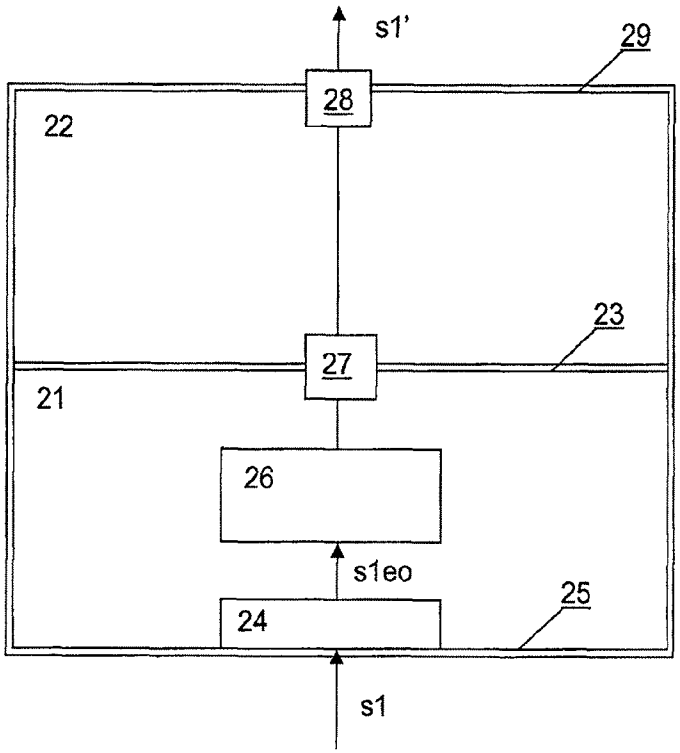
FIG. 3 illustrates an embodiment of the sensor unit according to the invention.

The proposed system and method for early train detection is based on multiple sensor installations able to detect various characteristics of trains moving on rail tracks and emitting warning signals or information signals at certain places along the rail tracks in the neighbourhood of the moving train. The main objective of the invention is to provide a simple and secure system for detecting trains at unsecured railroad crossings. However, the invention may also be used at any location where early detection of moving trains is of importance, such as e.g. rail track maintenance locations.

The waves generated by approaching trains are travelling through both the rails and the underground and are recorded by sensors located at the secured location, such as a level crossing to be secured. An early detection of these trains is facilitated due to the following principles, with reference to FIG. 1:

The propagation velocities of a first signal (s1), i.e. acoustic waves propagating in the rails, are faster than the running speed of moving trains (6). Consequently, train-induced wave fronts arrive much earlier at the point of observation than the train (6) [it self] *itself* does. Due to the large mass, moving trains (6) generate waves [(10a, 10b)] with high amplitudes. The travel distances of these waves are very long due to low attenuation effects. Thus, the particular pattern of these wave trains can be identified even at large distances (which increases the alert lead times). In general, the rails behave like waveguides for the waves, and these waves therefore have higher amplitudes than seismic waves.

Assuming that when the boundary conditions of the rail-embankment system remains stable, the propagating waves of comparable trains undergo only little variation both in amplitude, frequency content and signal characteristics. This allows for the definition of characteristic 'wave images' or signature for different train types.

The characteristic features in the acoustic and seismic recordings allow for the application of different signal processing techniques (waveform correlation, wavelet analysis and signal convolution methods) which are used in the detection algorithms.

Once the detection of a train is confirmed through the real-time analysis, a trigger signal will be immediately sent to the existing signal installations (flash lights, signal bells) or the turnpike controller. Signals derived from train detection comprising train direction, speed, time until arrival etc. may also in an embodiment be sent to a control centre for analyses or logging.

In the following the invention and embodiments of the invention will be described with reference to the drawings.

In FIG. 1 an embodiment of the invention is illustrated in a schematic drawing where a train detection system (1) comprises one or more sensor units (2a, 2b, . . . ) arranged for being fixed to at least one rail (10a, 10b) of a rail track, where each of the sensor units (2a, 2b, . . . ), arranged for detecting a first signal (s1) induced by a moving train (6) and propagated through the rail (10a, 10b), wherein each the sensor unit (2a, 2b, . . . ) is divided in at least a first chamber (21) and a second chamber (22), where the first and second chambers (21, 22) are separated by an electromagnetic shield (23), the first chamber (21) comprising;

a piezoelectric element (24) fixed to an outer wall (25) of the first chamber (21), an amplifier (26) arranged for amplifying a first element output signal (s1eo) representing the first signal (s1) detected by the piezoelectric element (25) where the first sensor output signal (s1') is the amplified output signal from the amplifier (26), the electromagnetic shield (23) comprising one or more feed-through means (27) arranged for transferring the first sensor output signal (s1') from the first chamber (21) to the second chamber (22).

In an embodiment the first chamber and/or the second chamber is constituted by one or more metallic boxes (21a, 22a, . . . ) inside the sensor units (2a, 2b, . . . ). The metallic boxes will further shield the low noise amplifier (26) from external noise outside the sensor units (2a, 2b, . . . ). The electromagnetic shield (23) separating the chambers may in this embodiment be constituted by the walls of the metallic boxes (21a, 22a, . . . ).

The position and the arrangement of the piezoelectric element (24) is important to achieve the best possible signal to noise ratio when detecting the first signal (s1). Calculations and experiments have shown that it may be advantageous to detect the signal on the side of the head of the rail. In one embodiment the sensor unit (2a, 2b, . . . ), is therefore arranged for being mounted on a substantial vertical side of a head (10h) of the rail (10a, 10b), and wherein the piezoelectric element (24) inside the sensor unit (2a, 2b, . . . ), is arranged for facing the vertical side of the head (10h) of the rail (10a, 10b). In an embodiment the sensor unit (2a, 2b, . . . ) further comprises a second piezoelectric element [(24a)] (not shown in the drawings) arranged for facing an underside of the head (10h) of said rail (10a, 10b).

According to an alternative embodiment the sensor units (2a, 2b, . . . ) comprise two or more piezoelectric elements that each are facing the rail. The piezoelectric elements may all face the side of the head of the rail, the web of the rail, or combinations of head, web and foot. In this embodiment the signals from the piezoelectric elements may be combined in the sensor unit, or amplified separately before processing.

According to an embodiment the train detection security system (1) comprises a control unit (3) comprising a signal processor (31) arranged for receiving first sensor output signals (s1') representing the first signals (s1) from each of the one or more sensor units (2a, 2b, . . . ), processing the first sensor output signals (s1') and generating a train warning signal (s10) representing characteristics of the moving train (6) based on characteristics of the first sensor output signals (s1').

The embodiments described above and below can be combined in different configurations, such that some chambers are constituted by a metallic box, while other chambers are not. The different sensor embodiments and configurations thereof can also be combined with different control [system] *unit* configurations calculations used for generating a warning signal.

In an embodiment the invention is a method for early detection of a moving train (6) on a train track, by using a train detection security system (1) comprising one or more sensor units (2a, 2b, . . . ) arranged for being fixed to at least one rail (10a, 10b), comprising the following steps;

fixing one or more of the sensor units (2a, 2b, . . . ) to at least one rail (10a, 10b), detecting one or more first signals (s1) acoustically propagated from the train (6) through the rail (10a, 10b) by the sensor units (2a, 2b, . . . ), receiving first sensor output signals (s1') representing the first signals (s1) in a signal processor (31), processing the first sensor output signal (s1') in the signal processor (31) and generating a train warning signal (s10) representing characteristics of the moving train (6) based on characteristics of the first sensor output signal (s1').

The method for early detection of a moving train (6) comprises in an embodiment the following steps;

detecting the one or more first signals (s1) by two or more piezoelectric elements (24) fixed to an outer wall (25) of a first chamber (21) of each the sensor units (2a, 2b, . . . ), amplifying the first element output signal (s1eo) representing the first signal (s1) detected by the piezoelectric element (25), in an amplifier of the first chamber (21), feeding a first sensor output signal (s1') of each the sensor units (2a, 2b, . . . ), through feed-trough means (27) of an electromagnetic shield of the each sensor units (2a, 2b, . . . ), from the first chamber (21) to a second chamber (22), and transferring the first sensor output signal (s1') or a modified first sensor output signal (s1') from the sensor units (2a, 2b, . . . ) to the signal processor (31) of said control [system] *unit* (3). In an embodiment the first sensor output signal (s1') is modified or converted in the second chamber (22) before transferred to the control [system] *unit*, to a format better suited for signal transfer.

In an alternative embodiment of the invention the train detection system (1) comprises a control unit (3) and one or more sensor units (2a, 2b, . . . ) arranged for being fixed to at least one rail (10a, 10b) of a rail track.

Each of the sensor units (2a, 2b, . . . ) is arranged for detecting a first signal (s1) induced by a moving train (6) and propagated through the rail (10a, 10b).

The control unit (3) comprising a signal processor (31) is arranged for receiving first sensor output signals (s1') representing the first signals (s1) from each of the one or more sensor units (2a, 2b, . . . ), continuously processing the first sensor output signals (s1') and generating a train warning signal (s10) representing characteristics of the moving train (6) based on characteristics of the first sensor output signals (s1').

In an embodiment the invention is a method for early detection of a moving train (6) on a rail (10a, 10b), by using a train detection security system (1) as described above, comprising the following steps;

fixing one or more of the sensor units (2a, 2b, . . . ) to at least one rail (10a, 10b) of a rail track, detecting one or more first signals (s1) induced by a moving train (6) and through the rail (10a, 10b) by the sensor units (2a, 2b, . . . ), receiving first sensor output signals (s1') representing the first signals (s1) in the computer implemented signal processor (31), continuously processing the first sensor output signal (s1') in the computer implemented signal processor (31) and generating a train warning signal (s10) representing characteristics of the moving train (6) based on characteristics of the first sensor output signal (s1') from at least two of the sensor units (2a, 2b, . . . ).

According to an embodiment of the invention the signal processor (31) is computer implemented. The signal processor (31) may use one or more physical processors on a computer to perform the calculations as described above. In an embodiment the signal processor (31) is partly embedded in hardware specifically designed for the tasks described above.

According to an embodiment of the invention the train detection system (1) comprises two or more sensor units (2a, 2b, . . . ).

One of the advantages of the system is its ability to determine various characteristics of the moving train (6), such as direction, speed, etc. by receiving and comparing signals from multiple sensor units (2a, 2b). However, due to the small signal diversity along the rail of the system, and between two sensors, it may be difficult due to derive some of the characteristics, such as e.g. direction of the train from the received signals. According to an embodiment, to improve signal diversity between sensors arranged on the same rail, an acoustic damper (7) arranged for damping the first signal (s1) is arranged in physical contact with the rail (10a, 10b) between two of the sensor units (2a, 2b,) fixed to the same rail (10a, 10b). The damper may be a gauge pad commonly used for train rubber grade crossings or any other suitable acoustic damper. The damper may be made of e.g. rubber, tree a combination of rubber and wood, or any other material with good acoustic damping properties.

In an embodiment of the invention the signal processor (31) comprises an envelope detector (32) arranged for continuously detecting an envelope signal (s1'e) of the first sensor output signal (s1') from each of the sensor units (2a, 2b, . . . ) and an envelope signal comparator (33) arranged for continuously comparing a time segment (T) of [at] the envelope signals (s1'e) detected from the first sensor output signal (s1') from at least one of the sensor units (2a, 2b, . . . ) with a predefined envelope signal (s1'p), wherein the computer implemented signal processor (31) is arranged for generating a train warning signal (s10) indicating an approaching train (6) when the envelope signal (s1'e) has an increasingly higher amplitude than the predefined envelope signal (p1'e) over the time segment (T). The signals (s1') and (s2') and envelope signals (s1'e) illustrated in FIGS. 1 and 2 are for illustration purposes only, and the signals and envelopes may have different shapes. A signal (s1') and (s2') will in general consist of numerous frequency components, and their amplitude will vary according to e.g. the speed of the train, the distance and the train type.

The pre-defined envelope signals (p1'e) that are used for comparison may be specific for each train type operating in the rail network. However, to improve the sensitivity of the train detection system (1) a more specific predefined envelope signal may be obtained by recording such signals for the specific location where the train sensors (2a, 2b, . . . ) are installed. These recorded signals may then be analysed to obtain a characteristic envelope used as pre-defined envelope signals.

According to the invention it is also possible to train the train detection system (1) by e.g. continuously adding measured envelope signals (s1'e) every time a train passes the sensors (2a, 2b, . . . ), to a collection of pre-defined envelope signals (p1'e). According to an embodiment of the invention one may also improve existing pre-defined envelope signals (p1'e) by applying statistical analysis or convolution techniques, such as e.g. mean value, median calculation for the continuously measured envelope signals (s1'e). Training may be performed before, or during operation of the train detection system (1).

According to an embodiment of the invention the envelope signal comparator (33) is arranged for continuously comparing the envelope signal (s1'e) for the first sensor output signal (s1') from at least two of the sensor units (2a, 2b, . . . ) fixed to the same rail (10a, 10b), and further arranged for detecting a direction (s11) of the moving train (6), where the train warning signal (s10) comprises the direction (s11) of the train (6).

The direction should preferably be relative the rail (10a, 10b) or relative the cardinal points.

In an embodiment the train detection security system (1) according to the invention is arranged for detecting the type of the moving train by comparing the envelope signal (s1'e) with predefined envelope signals (p1'e) for different train types. The envelope length for predefined envelope signals (p1'e) for different train types should be sufficient to distinguish a specific train type from the others, but may not necessarily need to comprise an envelope for the whole train set or train sets. In this embodiment the computer implemented signal processor (31) is arranged for generating a train warning signal (s10) representing a type (s12) of the moving train (6) when the envelope signal comparator (33) detects that the envelope signal (s1'e) is equivalent to a predefined envelope signal (p1'e) over the time segment (T).

In an embodiment of the invention the computer implemented signal processor (31) is arranged for generating a train warning signal (s10) representing the distance (s13) to an approaching train by comparing the increase or decrease in the amplitude of the envelope signal (s1'e) to the predefined envelope signal (p1'e) in the envelope signal comparator (33).

According to an embodiment the computer implemented signal processor (31) is arranged for generating a train warning signal (s10) representing the time until the moving train (6) arrives at the location where the sensors (2a, 2b, . . . ) are arranged, or to another location along the rail (10a, 10b) in known relative position to the sensors location.

According to an embodiment of the invention the train detection security system (1) is used to secure a train level crossing. In this embodiment at least two of said sensor units (2a, 2b, . . . ) are arranged on the same rail (10a, 10b) on opposite sides of a train level crossing. However, the sensor units (2a, 2b, . . . ) may also be on the same side of a train level crossing if that is found to be more convenient for the specific installation.

According to an embodiment of the invention the computer implemented signal processor (31) is arranged for generating a train warning signal (s10) comprising a waiting time to be presented for a vehicle waiting to cross the level crossing. The waiting time may be the remaining time until the train has passed with a security margin. The waiting time may be useful information for a driver, and could prevent risky situations where the driver takes the chance of crossing the track since no track is in sight. A waiting time indicator is an indication that the system is in operation and an incentive for the driver to wait until the train has passed.

According to an embodiment of the invention the train detection security system (1) comprises an audio signal comparator (34) arranged for comparing frequency components up to 50 kHz *or 200 kHz* of the first sensor output signal (s1') from at least two of the sensor units (2a, 2b, . . . ).

According to an embodiment of the invention the sensitivity of the train detection system may be improved by combining first sensor output signals (s1') or envelope signals (s1'e) from two or more of the sensor units (2a, 2b, . . . ) before comparing the resulting signal with predefined envelope signals (p1'e).

According to an embodiment of the invention the combination signal is an average value of the envelope signals (s1'e). The first sensor output signals (s1') may he Fourier transformed before the various frequency components are combined. In this embodiment some of the frequency components may be weighted differently than others. A band pass filter, high-pass filter or low pass filter may also be used to reduce the contribution from frequency components that represent primarily noise. The combination of signals as described above will improve the signal to noise ratio, and makes it possible to detect trains earlier. It also makes the calculation of output warning signals representing e.g. distance, speed, direction, time to arrival etc. more exact.

In an embodiment of the invention the train detection system (1) comprises four sensor units (2a, 2b, . . . ), two on each side of an acoustic damper (7) in the direction of the rail (10b, 10 b). In this embodiment the two sensors on one side can operate as a pair to improve the resulting signal to noise by applying convolution techniques or other relevant signal processing techniques as described above. When the resulting signal from each pair is compared with the resulting signal from the other pair of sensor units (2a, 2b, . . . ) a moving train (6) and its direction, speed etc may be derived from the available signals by continually comparing their signal envelopes with each other and pre-defined signal envelopes for known train types.

The characteristics of the sensor unit (2a, 2b, . . . ) are important for the ability of the train detection security system (1) to detect trains early. According to the invention each sensor unit (2a, 2b, . . . ) is divided in at least a first chamber (21) and a second chamber (22), where the first and second chambers (21, 22) are separated by an electromagnetic shield, or EMC, Electro Magnetic Compatibility shield (23), the first chamber (21) comprising;

a piezoelectric element (24) fixed to an outer wall (25) of the first chamber (21), an amplifier (26) arranged for amplifying a first element output signal (s1eo) representing the first signal (s1) detected by the piezoelectric element [(25)] *(24)* where the first sensor output signal (s1') is the amplified output signal from the amplifier (26), the electromagnetic shield (23) comprising one or more feed-through capacitors (27) arranged for transferring the first sensor output signal (s1') from the first chamber (21) to the second chamber (22), the second chamber (22) comprising one or more bushings (28) through one of its outer walls (29), the bushings arranged for electrical wires carrying the first sensor output signal (s1'). The sensor unit (2a, 2b, . . . ) according to the invention is able to detect and amplify the first signals (s1) from the moving train (6) where the first sensor output signals (s1') have a low signal noise ratio due to the arrangement of the sensor element directly fixed to the outer wall of the sensor unit. In an embodiment the outer wall (25) of the sensor unit (2a, 2b, . . . ) is glued directly to the rail (10a, 10b). The type of glue depends on the application of the system. Long lasting glue or screws may be used for permanent installations. For a train detection system (1) used at a maintenance location, a non-permanent glue may be used to allow easy removal after use. The double chambered sensor unit with the feed through capacitors (27) reduces the noise introduced into the first chamber (21), and thereby improves the signal to noise ratio of the system. The sensor element may in an embodiment of the invention be a piezoelectric element (24) glued or screwed directly to the outer wall (25).

Figure 4:
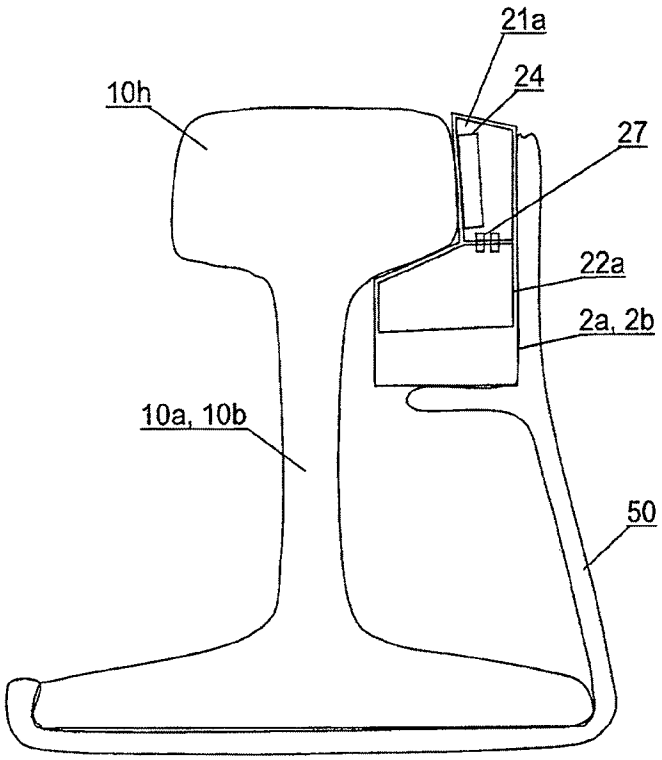
FIG. 4 illustrates in a section view an embodiment of some of the mechanical parts of the sensor unit and the fastening of the sensor unit to the rail by using clamps.

As an alternative to glue or screw, it may in an embodiment he advantageous to clamp the sensor unit (2a, 2b, . . . ) to the rail (10b, 10 b) as shown in FIG. 4, where a clamp (50) is arranged for clamping the sensor units (2a, 2b, . . . ) to the rail (10a, 10b).

Due to restrictions on the size of the installations in the tracks, the physical dimensions of the sensors should be small.

In an embodiment of the invention the sensors are based on accelerometer technology, where the sensor units (2) comprise a piezoelectric element[( )], and a noiseless amplifier. The piezoelectric element (24) may be fixed to the bottom of the sensor units (2) housing to ensure good acoustic contact between the piezoelectric element [( )] and the housing.

Other sensors may also be used in the system and method according to the invention. Important parameters are robustness and sensitivity, where candidate sensors could be geophones or MEMS sensors based on semi-conductor technology. Small-size sensors may be attached directly to the rails by e.g. using glue for this purpose giving the desired acoustic connectivity, or holes can be drilled through the rail profile in order to fasten the sensor by screws to the rail's exterior, or a clamp system designed. Alternative sensor fastening is to attach the sensors to the concrete sleepers next to or in-between the rails.

To be able to apply correlation and convolution methods for data analysis, several sensors may be installed on both rails according to an embodiment of the invention. The sensors may be placed at equidistant intervals along the track, or at varying intervals depending on the signal processing algorithm used.

In an embodiment of the invention*, security system* (*1a*) *uses* seismic signals [are used] in combination with acoustic signals to detect the moving train as seen in FIG. 2. One or more of the sensor units (2a, 2b, . . . ), are arranged for detecting a second signal (s2) seismically propagated from the train [(t)] through the ground, where the computer implemented signal processor (31) is arranged for receiving a second sensor output signal (s2') representing the second signal (s2) from one or more of the sensor units (2a, 2b, . . . ), continuously processing the second sensor output signal (s2') and generating the train warning signal (s10) representing characteristics of the moving train (6) based on characteristics of the first sensor output signals (s1') and the second sensor output signals (s2').

In an embodiment of the invention separate sensor units (2a, 2b, . . . ) are used for detecting acoustic and seismic signals. Further the sensor cables from each of the sensor units (2a, 2b, . . . ) may be separate all the way from each of the sensors to the control unit (3). In this embodiment the control unit (3) may use different algorithms for processing the signals (s1') and (s2') from the respective seismic and acoustic detectors.

In a preferred embodiment of the invention the sensors are close to the control [system] *unit* or central acquisition system and sensor cables are quite short. However, in an embodiment of the invention sensor cables up to one hundred meters are used to carry the signals from the sensors to the central acquisition system. Even though these cables are quite resistant, they may be covered by cladding tubes in case of a permanent installation over several months to prevent damage to the cables.

In an embodiment of the invention the handling, digital conversion and storage of the acoustic and/or seismic data is done by an acquisition system able to process data from multiple channels in a continuous mode. Standard equipment for conventional acoustic and/or seismic applications as understood by a person skilled in the art are suitable for these requirements.

According to an embodiment of the invention a train warning signal (s10) comprising a track anomaly signal (s14) is generated when an anomaly is detected in the rails (10a, 10b). The track anomaly signal (s14) may be generated when no train is on the rail track and noise characteristics are different than a normal condition. It may be due to unexpected difference in received signal from the train on two rails of the rail track carrying the same train, such as signal envelope difference or frequency component difference. In a similar embodiment a train anomaly signal may also he generated when the received signals indicate an anomaly of the train, such as e.g. problems with damaged wheels.

The invention claimed is:

1. A train detection security system, comprising:

one or more sensor units arranged for being fixed to at least one rail of a rail track, each of said one or more sensor units being arranged for detecting a first signal induced by a moving train and propagated through said rail and outputting a first sensor output signal; and a control unit comprising a signal processor implemented by a computer and arranged for receiving the first sensor output signal from each of said one or more sensor units, and processing said first sensor output signal, wherein said signal processor comprises;

an envelope detector arranged for detecting an envelope signal of said first sensor output signal from each of said one or more sensor units; and an envelope signal comparator arranged for comparing a time segment of said envelope signal detected from said first sensor output signal from at least one of said one or more sensor units with a predefined envelope signal, and wherein said signal processor is arranged for generating a train warning signal indicating an approaching train when said envelope signal has an increasingly higher amplitude than said predefined envelope signal over said time segment, said train warning signal representing characteristics of said moving train.

2. The train detection security system according to claim 1, wherein said envelope signal comparator is arranged for comparing said envelope signal for said first sensor output signal from at least two of said one or more sensor units fixed to said same rail, and further arranged for detecting a direction of an said moving train, wherein said train warning signal comprises said direction of said train.

3. The train detection security system according to claim 2, wherein said signal processor is arranged for generating the train warning signal comprising a train type of said moving train when said envelope signal comparator detects that said envelope signal is equivalent to the predefined envelope signal over said time segment.

4. The train detection security system according to claim 1, wherein said signal processor is arranged for generating the train warning signal comprising a distance to said moving train by comparing said increase or decrease in said amplitude of said envelope signal to said predefined envelope signal in said envelope signal comparator.

5. The train detection security system according to claim 1, wherein said signal processor is arranged for generating the train warning signal comprising a waiting time to be presented for a vehicle waiting to cross a train level crossing.

6. The train detection security system according to claim 1, *wherein the one or more sensor units comprises two or more sensor units, and*

*further* comprising an audio signal comparator arranged for comparing frequency components up to 200 kHz of said first sensor output signal from at least two of [said one or more] *the two or more* sensor units.

7. The train detection security system according to claim 1, wherein each of said one or more sensor units is divided in at least a first chamber and a second chamber, wherein said first and second chambers are separated by an electromagnetic shield, said first chamber comprising:

a piezoelectric element fixed to an outer wall of said first chamber and arranged to detect the first signal; and an amplifier arranged for amplifying the first sensor output signal representing said first signal, said electromagnetic shield comprising one or more feed-through means arranged for transferring said first sensor output signal after being amplified from said first chamber to said second chamber.

8. The train detection security system according to claim 7, wherein said first chamber and/or said second chamber is constituted by one or more metallic boxes.

9. The train detection security system according to claim 7, wherein each of said one or more sensor units is arranged for being mounted on a substantially vertical side of a head of said rail, and wherein said piezoelectric element inside said each of said one or more sensor units is arranged for facing said substantially vertical side of said head of said rail.

10. The train detection security system according to claim 9, wherein each of one or more sensor units further comprises a second piezoelectric element arranged for facing an underside of said head of said rail.

11. The train detection security system according to claim 1, comprising a clamp arranged for clamping said one or more sensor units to said rail.

12. The train detection security system according to claim 1, wherein at least two of said one or more sensor units are arranged on the same rail on opposite sides of a train level crossing.

13. The train detection security system according to claim 1, wherein an acoustic damper arranged for damping said first signal is arranged in physical contact with said rail between two of said one or more sensor units both fixed to said rail.

14. A method for early detection of a moving train on a train track, by using a train detection security system with a control unit comprising a signal processor and one or more sensor units arranged for being fixed to at least one rail, the method comprising the steps of:

detecting one or more first signals acoustically propagated from said train through said rail by said one or more sensor units;

receiving first sensor output signals representing said one or more first signals in the signal processor;

processing said first sensor output signals in said signal processor of the control unit;

detecting an envelope signal of said first sensor output signal from each of said one or more sensor units;

comparing a time segment of said envelope signal detected from said first sensor output signal from at least one of said one or more sensor units with a predefined envelope signal; and generating a train warning signal indicating an approaching train when said envelope signal has an increasingly higher amplitude than said predefined envelope signal over said time segment, said train warning signal representing characteristics of said moving train.

15. The method according to claim 14, further comprising the steps of:

comparing said envelope signal for said first sensor output signal from at least two of said one or more sensor units fixed to said same rail; and detecting a direction of said moving train, wherein said train warning signal comprises said direction of said train.

16. The method according to claim 14, further comprising the step of generating the train warning signal comprising a train type of said moving train when said envelope signal comparator detects that said envelope signal is equivalent to the predefined envelope signal over said time segment.

17. The method according to claim 14, further comprising the step of generating the train warning signal comprising a distance to said moving train by comparing said increase or decrease in said amplitude of said envelope signal to said predefined envelope signal in said envelope signal comparator.

18. The method according to claim 14, further comprising the step of generating the train warning signal comprising a waiting time to be presented for a vehicle waiting to cross a train level crossing.

19. The method according to claim 14, *wherein the one or more sensor units comprises two or more sensor units, and* further comprising the step of comparing frequency components up to 200 kHz of said first sensor output signal from at least two of [said one or more] *the two or more* sensor units.

20. The method according to claim 14, further comprising the steps of recording said first sensor output signal for a specific location where the one or more sensor units are installed; and analyzing said first sensor output signal to obtain a characteristic envelope for a specific train type used as said pre-defined envelope signal.

* * * * *